J. M. READ.

Stove-Pipe Damper.

No. 8,790. Reissued July 8, 1879.

Witnesses:
A. F. Gaylord
Harrison Freeman

Inventor:
J. M. Read
By Wm. E. Simonds
Atty

N. PETERS, PHOTO-LITHOGRAPHER, WASHINGTON, D. C.

UNITED STATES PATENT OFFICE.

JOSIAH M. READ, OF BOSTON, MASSACHUSETTS.

IMPROVEMENT IN STOVE-PIPE DAMPERS.

Specification forming part of Letters Patent No. 144,634, dated November 18, 1873; Reissue No. 8,790, dated July 8, 1879; application filed March 17, 1879.

*To all whom it may concern:*

Be it known that I, JOSIAH M. READ, of Boston, in the county of Suffolk and State of Massachusetts, have invented an Improved Damper for Stove-Pipes, whereof the following is a specification, reference being had to the accompanying sheet of drawings, wherein—

Figure 1:
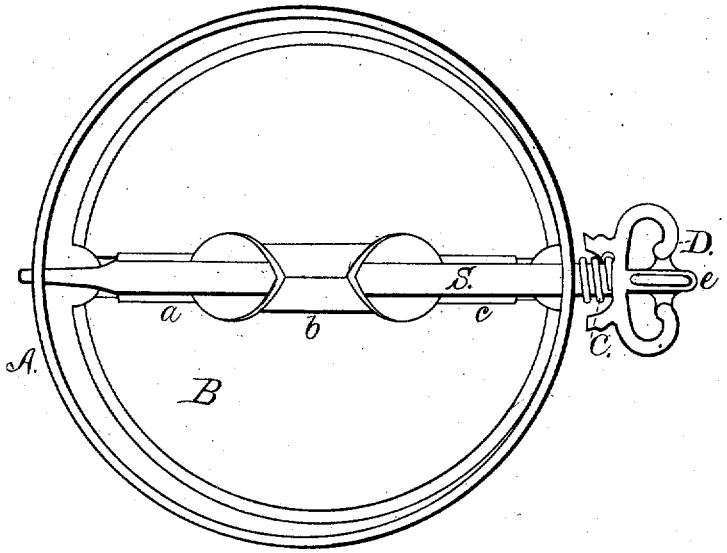
Figure 1:
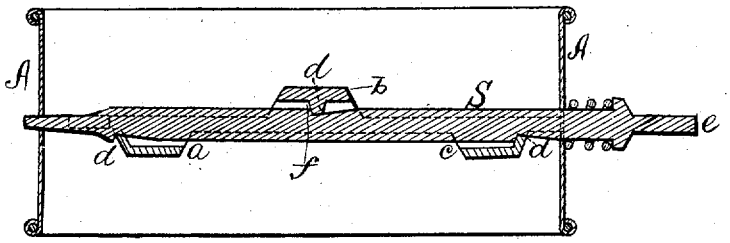

Figure 1 denotes a top view of a stove-pipe having a damper constructed and applied thereto in accordance with my invention. Fig. 2 is a view of the same in central vertical section.

The object of my invention is to remedy sundry defects incident to the construction and operation of rotary dampers as ordinarily employed.

In the ordinary construction of dampers of this character the disks and their spindles are made of cast-iron and formed separately.

Owing to a want of uniformity in the castings, many of the spindles do not fit their receiving-sockets in the disks, the spindles being, of necessity, formed smaller than the sockets. Great numbers of them are found to be so imperfect as to require to be wedged in order to fasten them securely to the disk. Another disadvantage of a large portion of the ordinary rotary dampers is, that they have no certain means of moving and maintaining them in the desired position to properly regulate the draft.

I will first describe my apparatus, and then point out the invention in the claims.

In the drawings, A denotes the stove-pipe; B, a flat metallic disk of a diameter very nearly corresponding with the internal diameter of the pipe, the same being provided with spindle-receiving sockets *a b c*. These sockets conform, in a general sense, to the shape of the spindle, two of them, *a* and *c*, being on one side of the disk, and the other or central one being on the other side thereof. These sockets (two or more of them) are provided each with a tension-rib or bridge, *d*, extending transversely of the socket, the outer bridges being disposed near the outer extremity of their sockets, while the central one is arranged near the middle of its socket, the object of such arrangement being to give the spindle S the greatest amount of resilient force. As before mentioned, the spindle corresponds, generally, in cross-section to the shape of the spindle-receiving sockets. The spindle is also provided with a locking-shoulder, *f*, to operate with one of the tension-bars or bridges, to preserve the normal position of the spindle with respect to the disk. Such, however, is only required in the larger size of dampers.

C is a spring carried on the shank of the spindle, bearing on one side against the button D of the spindle, its other end bearing against the outer surface of the pipe, such spring having a force sufficient to preserve and maintain the disk in any position in which it may be set.

I do not claim forming the damper-disk with sockets to receive the spindle, whereby the two, when applied together, are prevented from turning, as I am aware that such is not new.

Having described my apparatus, what I claim as my invention is as follows:

1. In a stove-pipe damper, substantially as described, the socketed disk B, formed with bridges or tension-bars, to operate with the spindle in manner and for the purpose set forth.

2. The pipe A, socketed disk B, spring C, and spindle S, provided with locking-shoulder *f*, all combined for operation and use substantially as shown and described.

3. The socketed disk B, formed with bridges or tension-bars, and combined with the spindle S, provided with locking-shoulder *f*, all substantially as described.

JOSIAH M. READ.

Witnesses:

F. F. RAYMOND, 2d,

GEO. F. WALKER.